United States Patent
Okmianski et al.

(10) Patent No.: US 7,165,129 B1
(45) Date of Patent: Jan. 16, 2007

(54) METHOD AND APPARATUS FOR SELF-TUNING TRANSACTION BATCHING

(75) Inventors: Anton Okmianski, Lincoln, MA (US); Mickael Graham, Hopkinton, MA (US); Timothy Webb, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 10/764,854

(22) Filed: Jan. 26, 2004

(51) Int. Cl.
*G06F 3/00* (2006.01)
*G06F 13/00* (2006.01)
*G06F 12/00* (2006.01)

(52) U.S. Cl. .................... 710/52; 710/57; 710/29; 710/35; 711/135

(58) Field of Classification Search .............. 710/15, 710/18, 29, 30, 33–35, 52, 57; 709/223–226
See application file for complete search history.

(56) References Cited

U.S. PATENT DOCUMENTS

| | | | | |
|---|---|---|---|---|
| 5,615,362 A | * | 3/1997 | Jensen et al. ........... 707/103 R |
| 5,664,106 A | * | 9/1997 | Caccavale ................. 709/224 |
| 6,570,848 B1 | * | 5/2003 | Loughran et al. ........ 370/230.1 |
| 2002/0091722 A1 | * | 7/2002 | Gupta et al. ................ 707/204 |
| 2004/0215872 A1 | * | 10/2004 | Dawson et al. ............. 711/111 |

* cited by examiner

*Primary Examiner*—Fritz Fleming
*Assistant Examiner*—David Martinez
(74) *Attorney, Agent, or Firm*—Chapin IP Law, LLC; Barry W. Chapin, Esq.

(57) ABSTRACT

In a transaction system, a dynamic batching process enables efficient flushing of data in a data buffer to a stable storage device. The transaction system uses constant values and dynamic values and a system performance history to adjust the rate of flushing data and also to adjust the amount of data flushed in each flush operation. The transaction system is able to respond to both spikes in rate of received transactions as well as more gradual changes in the rate of received transactions and to automatically adapt to stable storage device performance variations.

20 Claims, 9 Drawing Sheets

150 →

| DATA BUFFER SIZE RANGE | OBSERVED TIMES TO FLUSH THE DATA BUFFER | | | TARGET DATA BUFFER SIZE |
|---|---|---|---|---|
| | ENTRY 1 | ENTRY 2 | ENTRY 3 | |
| 0 - 10 K | 12 | 15 | 11 | 5 K |
| 10 K - 100 K | 14 | 17 | 16 | 55 K |
| 100 K - 500 K | | | | 300 K |
| 500 K - 1 Mb | | | | 750 K |
| 1 Mb - 2 Mb | | | | 1.5 Mb |
| 2 Mb - 5 Mb | | | | 3.5 Mb |
| 5 Mb - 10 Mb | | | | 7.5 Mb |
| 10 Mb - 20 Mb | | | | 15 Mb |

FIGURE 5

METHOD AND APPARATUS FOR SELF-TUNING TRANSACTION BATCHING

BACKGROUND OF THE INVENTION

Transaction processing is an important aspect of systems that provide data durability, such as databases or reliable message processing systems. In computer programming, a transaction typically means a sequence of information exchange and related work, such as database updating, that is treated as a unit for the purposes of satisfying a request and for ensuring system integrity. High transaction throughput and low average response times are desirable performance characteristics of systems using transaction processing.

Generally in transaction processing, a transaction is processed in its entirety before the transaction is considered complete. For example, in transaction processing in a database system, database changes over the course of a transaction are tracked. If a transaction fails to be processed in its entirety, any changes to the database are then undone. For example, when a database transaction completes successfully, the database changes are said to be "committed" and when a transaction does not complete, database changes are "rolled back."

Transaction systems are typically required to provide transaction durability. Durability is the guarantee that once a user has been notified of the success of a particular transaction, the transaction actions, such as database changes, will persist. In a database system, modifications intended for the database are first written to a memory buffer and then applied to persistent storage. The process of persisting data, such as transaction data, from temporary storage, such as a memory buffer, to more permanent storage, such as a disk, is called a flush.

SUMMARY OF THE INVENTION

Conventional computer technology does not provide a system for efficient transaction processing. Transaction processing performance is often slowed by the underlying disk operations including those associated with a flush. Disk operations typically have a high fixed overhead associated with updating metadata, e.g., i-node information, and with writing data physically to the persistent media. In a transaction system that ensures transaction durability, the rate of transaction throughput can be bottlenecked by how quickly the data can be written to stable storage.

One conventional performance enhancement technique is to batch multiple transactions together. Writing in batches amortizes the fixed overhead such as metadata updates, e.g. i-node updates and disk seek time.

Batching improves throughput and response time. If, however, the system batches too little, neither throughput nor response time is optimal. By flushing small amounts of data when the rate of data accumulation is low, the system wastes disk resources. If the disk resources are unavailable for some time because of too-frequent flush operations, the system performance is less than optimal. Batching too much ("over-batching") may slow response time. Over-batching can also hold system resources from other tasks and inhibit the overall throughput. For example, some transaction systems limit the number of concurrent transactions executing at one time in order to limit memory consumption and context switching. If a transaction thread is blocked while waiting for a flush, i.e., a copying of buffered data to persistent media, then the thread is not available to process a new incoming transaction.

One conventional batching method involves invoking a flush at pre-defined periods using a timer. The duration of the interval is usually determined statically by running performance tests with various values under some predefined load. Conventional static batching methods, such as this method, assume that transaction data accumulates at a steady rate during the batching interval. This is typically not the case. The static approach is inadequate in situations where there is a varying load on the system or where the hardware exhibits inherently different performance. For example, a redundant array of independent disks (a "RAID array") with a memory-backed write cache initially provides a high rate of performance, but when the cache fills and has to be written to disk, the performance degrades. In a multi-threaded application, the uneven nature of thread scheduling on the central processing unit (CPU) causes the rate of data accumulation to fluctuate. The result is that the static timer approach either batches too little or too much resulting in non-optimal performance.

Embodiments of the present invention significantly overcome such deficiencies and provide mechanisms and techniques for self-tuning transaction batching in which throughput and response time are optimized by optimizing the amount of data in each flush and the times to flush. The self-tuning batching system uses dynamically-determined parameters. In addition, the self-tuning system tunes continuously during transaction system execution based on observed performance. The self-tuning batching system provides optimum throughput and response time under varying conditions such as load variation and disk performance variation.

More specifically, embodiments of the invention provide methods and apparatus that efficiently batch transactions. One such method embodiment includes the step of receiving a transaction at a transaction system. The system then writes the received transaction data to a data buffer. The system then determines whether the received transaction is the only transaction in the system. If the received transaction is the only received transaction in the system, the system flushes the data buffer to a stable storage device. If the received transaction is not the only transaction in the computerized system, the system determines whether a maximum response time will be met for the oldest transaction in the system if the data buffer flushed to the stable storage device immediately. If the maximum response time will not be met, then the system flushes the data buffer to the stable storage device. If the maximum response time will be met, then the system determines whether a rate of data of incoming transactions is higher than a rate of flushing data from the data buffer to the stable storage device if flushed immediately. If the rate of data of incoming transactions is lower than the rate of flushing data from the data buffer to the stable storage device if flushed immediately, then the system flushes the data buffer to the stable storage device. If the rate of incoming data is higher than the rate of flushing data from the data buffer to the stable storage device if flushed immediately, then the system waits to receive another transaction. The system updates the flush performance history after each flush of the data buffer to the stable storage device. In this way, the transaction system makes the decision to flush based on certain feedback.

In another embodiment of the invention, system determines whether the maximum response time will be met by determining a time queued of the oldest transaction in the computerized system. The system then determines the amount of data in the data buffer. The system then uses the flush performance history to compute the time duration to flush the data buffer to the stable storage device based on the amount of data in the data buffer. The system calculates the expected delay in flushing the oldest transaction to the stable storage device by subtracting the time when the oldest transaction announced that it was waiting for flush from the current time and adding the time to flush the data buffer to the stable storage device. The system compares the expected delay to a maximum response value. If the expected delay is greater than or equal to the maximum response value, then the system flushes the data buffer to the stable storage device. Finally, if the expected delay is less than the maximum response value, the system proceeds to determining the rate of incoming data. The maximum response time logic provides a guaranteed response time of the transaction system to incoming transactions.

In another embodiment of the invention, the system determines whether a rate of incoming data associated with the recently received transactions is higher than the rate of flushing the data buffer to the stable storage device if flushed now. The system first determines the recent rate of incoming transactions. The system then determines the amount of data submitted by an average transaction to the data buffer. The system computes the average rate per second of the amount of data submitted to the data buffer by received transactions. The system then determines the target amount of data in the data buffer that is needed to achieve sufficient batching in a flush operation based on the rate of incoming data and the flush performance history. The system then determines the amount of data currently in the data buffer. The system compares the amount of data in the data buffer to the target amount of data. If the amount of data in the data buffer is less than or equal to the target amount of data, then the system waits for a next transaction waiting for flush. If the amount of data in the data buffer is greater than the target amount of data, then the system flushes the data buffer to the stable storage device. By responding to the rate of incoming data, the transaction system is able to adjust the frequency of flushing to keep up with incoming transactions.

In another embodiment of the invention, the system flushes the data buffer to the stable storage device using the following process. The system first determines how many transactions are waiting for a flush of the data buffer. The system then determines the amount of data in the data buffer. The system persists the data in the data buffer to the stable storage device. The system then marks previously used memory by the data buffer as available for re-use. The system resets the data buffer size parameter to zero. The system determines a duration for the writing, marking and resetting steps. The system updates the data buffer flush performance history with the determined duration for writing, marking and resetting. The system then determines the amount of data submitted by an average transaction to the data buffer. The system updates the average transaction data buffer size parameters. The system then notifies waiting transactions that the flush has completed. The transaction system writes the data persistently to stable storage before notifying transactions of completion. In this way, the system ensures transaction durability.

In another embodiment of the invention, the flush performance history is a table having a plurality of buckets, each bucket having a minimum and a maximum amount of data buffer data for which that bucket holds statistics, each bucket capable of storing a plurality of entries. Each entry is the observed time to flush the data in the data buffer to the stable storage device. The system updates the table of rates by selecting a bucket in the plurality in which to record the data update based on the amount of data in the data buffer during the flush. The system then enters the data update into the selected bucket wherein the data update includes a time duration for flushing the data in the data buffer to the stable storage device. The transaction system is able to make adjustments based on historical data in order to respond to changes in the incoming transactions.

In another embodiment of the invention, the system updates the table of rates in the flush performance history by comparing the number of entries in the selected bucket to a bucket history length constant. If the number of entries in the selected bucket is more than the bucket history length constant, the system removes the oldest entry. Limiting the flush performance history to the more recent values keeps the table statistics current and more accurate.

In another embodiment of the invention, the flush performance history is a table having a plurality of buckets, each bucket having a minimum and a maximum amount of data buffer data for which that bucket holds statistics, each bucket capable of storing a plurality of entries. Each entry is an observed time to flush the database to the stable storage device. The system determines a target amount of data for a flush by selecting a first bucket in the flush performance history. The system then determines a minimum and maximum amount of data buffer data for which the selected bucket holds flush statistics. Based on the minimum and maximum amount of data, the system determines the average amount of data in the data buffer for which the selected bucket holds flush performance data. The system then calculates the average duration of a flush of the data buffer by averaging values in the plurality of entries in the selected bucket. The system then calculates the number of times per second that a flush can be performed based on the average duration of a flush. The system then calculates the rate of flushing for the selected bucket. The system compares the rate of flushing data for the selected bucket to the rate of incoming data. If the rate of flushing for the selected bucket is not less than the rate of incoming data, then the system takes the average data amount of data in the data buffer for the selected bucket as the target amount of data. If the rate of flushing for the selected bucket is less than the rate of incoming data, the system determines whether there is at least one other bucket in the flush performance history. If there is at least one other bucket in the flush performance history, the system selects the next bucket in the flush performance history and repeats the process above. If there is not at least one other bucket in the flush performance history, then the system takes the average data amount of data in the data buffer for the selected bucket as the target amount of data. The target amount of data determines the amount of batching done by the transaction system in order to flush the data buffer efficiently.

In another embodiment of the invention, a method for efficiently batching transactions in a database system, includes the step of receiving a transaction at the database system. The database system then writes the received transaction data to a data buffer. The database system then flushes the data buffer to a database if the received transaction is an only transaction in the computerized system. The database system next determines whether a maximum response time will be met for the oldest transaction in the computerized system if the received transaction is not the only transaction in the computerized system. The database system flushes the data buffer to the database if the maximum response time will not be met. If the maximum response time will be met, the database system then determines whether a rate of data of incoming transactions is higher than a rate of flushing data from the data buffer to the database if flushed immediately. If the rate of data of incoming transactions is lower than the rate of flushing data from the data buffer to the database if flushed immediately, the database system then flushes the data buffer to the database. If the rate of incoming data is higher than the rate of flushing data from the data buffer to the database if flushed immediately, then the database system waits to receive another transaction. Finally, the database system updates the flush performance history after each flush of the data buffer to the database. In this way, the database system makes the decision to flush based on certain feedback.

In another embodiment of the invention, a transaction system that efficiently batches transactions includes a data interface to receive transactions, a stable storage device to stored processed transactions, a memory and a controller. The memory holds the data buffer and the system performance history. The system performance history includes system performance data about rates of flushing the data buffer to the stable storage device and batch sizes of flushing the data buffer to the stable storage device. The controller is coupled to the interface, the stable storage device and the memory. The controller is configured to process the transactions, to write the processed transactions to the data buffer, to flush the data buffer to the stable storage device according to the system performance data from the system performance history, and to update the system performance history with data from the flush of the data buffer to the stable storage device. The transaction system efficiently flushes the data buffer to the stable storage device by adjusting flushing parameters according to the system performance history.

In a further embodiment of the invention, a database system that efficiently batches transactions includes a data interface to receive database transactions, a stable storage device having a database to store processed database transactions, a memory and a controller. The memory holds the data buffer and the system performance history. The system performance history includes system performance data about rates of flushing the data buffer to the database and batch sizes of flushing the data buffer to the database. The controller is coupled to the interface, the stable storage device and the memory. The controller is configured to process the transactions, to write the processed transactions to the data buffer, to flush the data buffer to the database according to the system performance data from the system performance history, and to update the system performance history with data from the flush of the data buffer to the database. The database system efficiently flushes the data buffer to the database by adjusting flushing parameters according to the system performance history.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

FIG. 5 is a block diagram of the data buffer flush performance history;

DETAILED DESCRIPTION

In a transaction system, a dynamic batching process enables efficient flushing of data in a data buffer to a stable storage device. The transaction system uses constant values and dynamic values and a system performance history to adjust the rate of flushing data and also to adjust the amount of data flushed in each flush operation. The transaction system is able to respond to both spikes in rate of received transactions as well as more gradual changes in the rate of received transactions and to adapt to the various constant and dynamic changes in the performance characteristics of underlying hardware.

Figure 1:
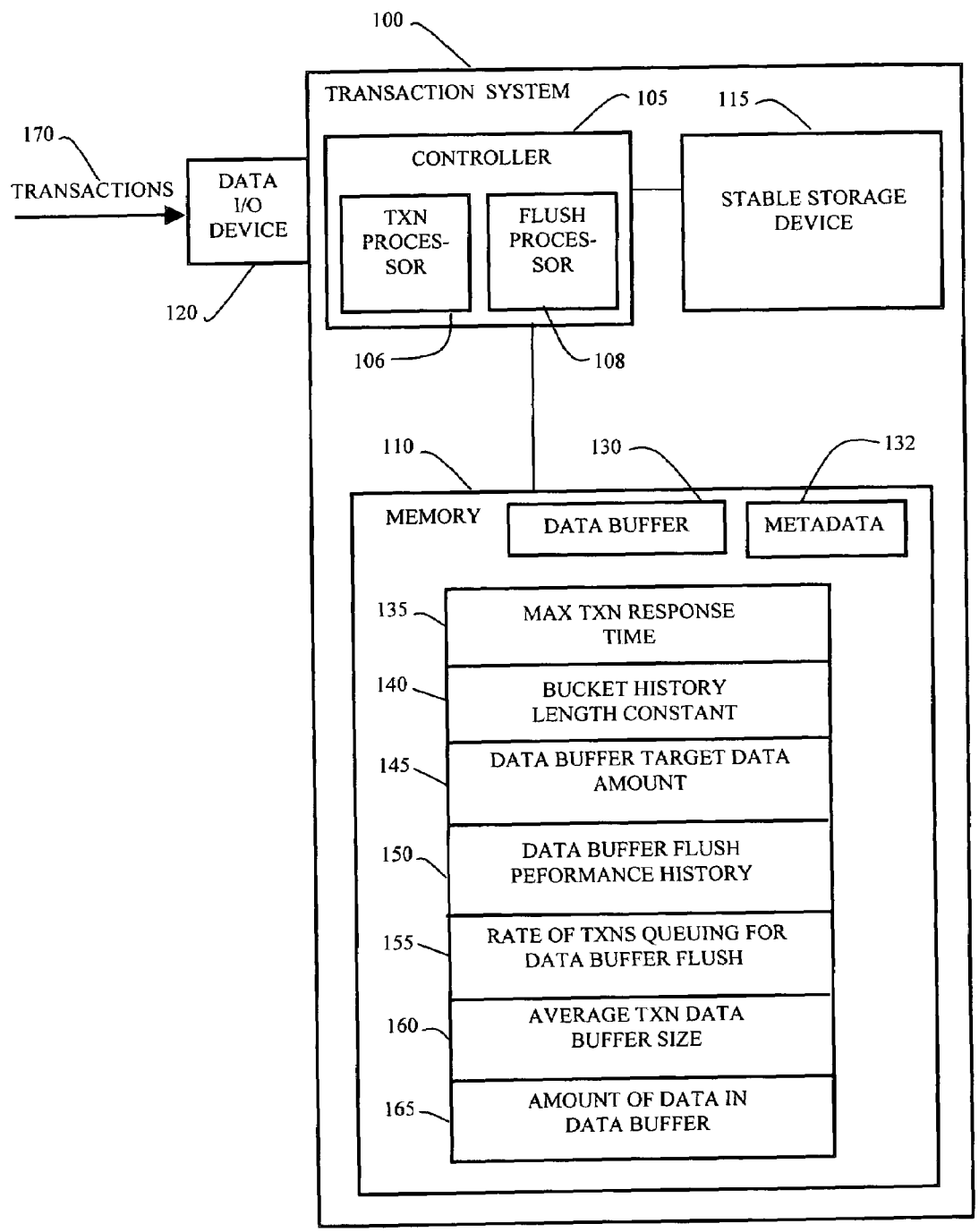
FIG. 1 is a block diagram of a transaction system according to principles of the invention.

FIG. 1 is a block diagram of an example embodiment of a transaction system 100 according to principles of the invention. The transaction system 100 is, for example, a computer. Alternatively, the transaction system 100 is a database system. The transaction system 100 includes a controller 105, a memory 110 and a stable storage device 115. A data input/output device 120 is connected to the transaction system 100. The stable storage device 115 is, for example, a hard drive and includes a database of transaction data 125. In alternative embodiments of the invention, the stable storage device 115 is an external device to the transaction system 100 such as another computerized device, a file server, or any other type of stable storage device. The controller 105 controls the operation of the transaction system 100 in conjunction with the memory 110. The controller 105 includes a transaction processor 106 for receiving and processing transactions and a flush processor 108 for controlling flush operations. The memory 110 includes a data buffer 130 and metadata 132 about data in the data buffer 130. The memory 110 also stores a plurality of constant and variable values used during operation of the transaction system 100. These values are a maximum response time 135, a bucket history length constant 140, a data buffer target data amount 145, a data buffer flush performance history 150, a rate of transaction queuing for data buffer flush 155, an average transaction data buffer size 160, and an amount of data in the data buffer 165. The transaction system 100 uses these values to guarantee a certain response time while maximizing throughput. It does this by adjusting the timing and size of each flush of the data buffer 130 to the stable storage device 115. These values will be explained in greater detail with regard to the figures below.

In operation, the transaction system 100 receives transactions 170 at the data input/output device 120. As defined above, a transaction is a sequence of related work that is treated as a unit for the purposes of satisfying a request. The transaction system 100 processes the transaction as described below with regard to FIG. 2. The transaction system 100 writes transaction data to the data buffer 130 before persisting this data to the stable storage device 115. The transaction system 100 maintains metadata 132 in association with the data buffer 130. The metadata 132 includes, for example, the number of transactions in the data buffer 130 waiting to be persisted to the stable storage device 115, the time that each transaction was ready for flush to the stable storage device 115, i.e., the time that each transaction was announced by the transaction processor 106, and also amounts of data submitted to the data buffer 130 for some number of recent transactions, for example, the last five transactions. The persisting of the transaction results to the stable storage device 115 is described in greater detail below with regard to FIGS. 3–8.

Figure 2:
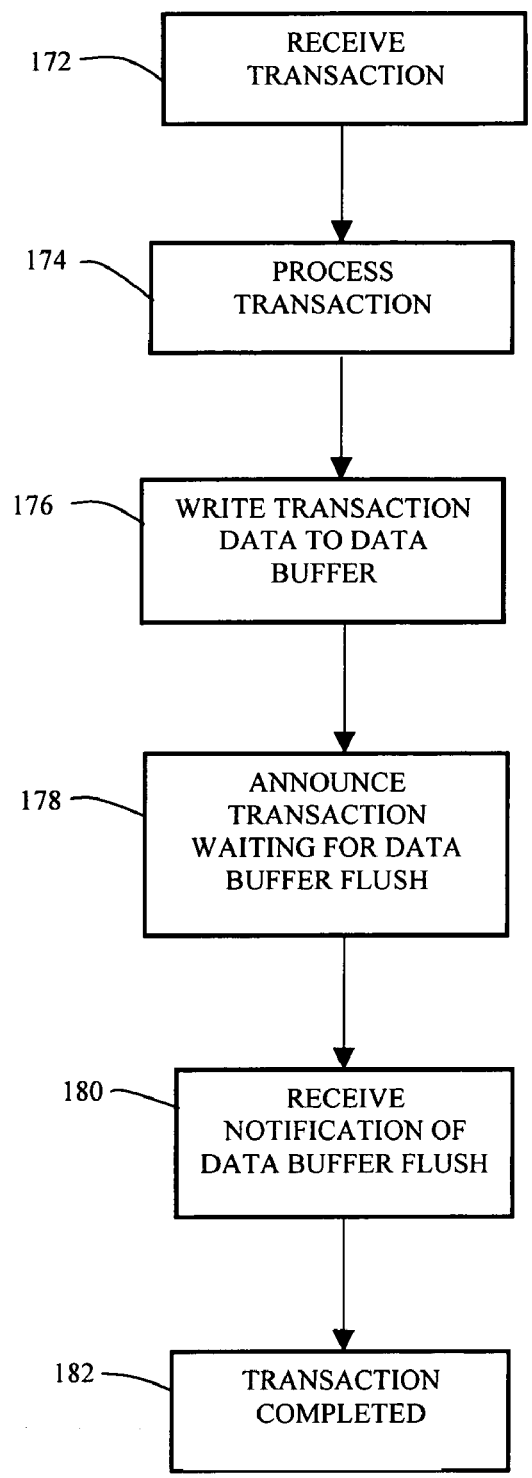
FIG. 2 is a flow chart of processing a transaction in the transaction system of FIG. 1.

FIG. 2 is a flow chart of processing a transaction in the transaction system of FIG. 1.

At step 172, the transaction system 100 receives a transaction 170. In some embodiments of the invention, the transaction system 100 is connected to a computer network and the received transactions are received over the computer network. The received transaction is, for example, a database transaction.

At step 174, the transaction system 100 controlled by the controller 105 operating in conjunction with the memory 130 processes the transaction 170.

At step 176, the transaction processor 106 writes the data of the transaction 170 to the data buffer 130. The transaction system 100 of the present invention implements a system in which data from intermediate steps of the transaction are written to the data buffer 130.

At step 178, the transaction processor 106 announces to the flush processor 108 that a transaction is waiting in the data buffer 130 for flush to the stable storage device 115. That is, the transaction processor 106 has finished processing the transaction 170 and the processing was completed successfully. At this point, the transaction 170 is ready to be persisted to the stable storage device 115. This is done by a flush operation in which the data in the data buffer 130 is copied to the stable storage device 115. The flush processor 108 then flushes the data buffer 130 to the stable storage device 115 as described below according to the present invention.

At step 180, the transaction processor 106 receives notification from the flush processor 108 that the data buffer 130 was flushed to the stable storage device 115.

At step 182, the transaction is completed.

Figure 3:
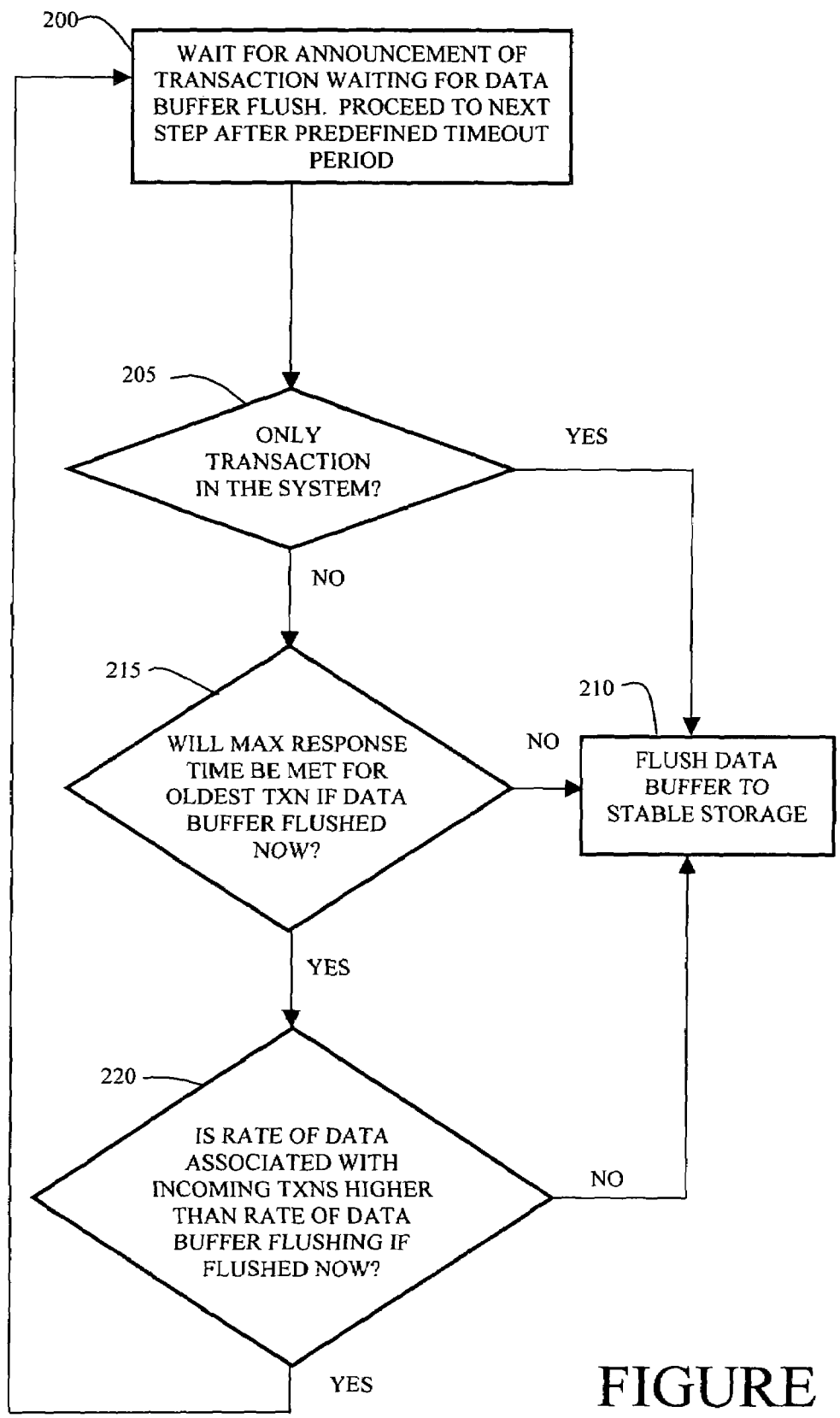
FIG. 3 is a flow chart of the operation of the flush processor of FIG. 1.

FIG. 3 is a flow chart of the operation of the flush processor of FIG. 1.

At step 200, the flush processor 108 waits for an announcement of a transaction waiting for a data buffer flush or waits for a predetermined timeout period and then proceeds to the next step.

At step 205, the flush processor 108 determines whether there is only one transaction waiting for flush to the stable storage device 115. If there is an only transaction waiting for flush in the transaction system 100, the flush processor 108 proceeds to step 210. If there is more than one transaction waiting for flush to the stable storage device 115, the flush processor proceeds to step 215.

At step 210, the flush processor 108 flushes the data buffer 130 to the stable storage device 115. The process of flushing is described in FIG. 8.

At step 215, the flush processor 108 determines whether the maximum response time 135 will be met for an oldest transaction in the data buffer 130 if the data buffer 130 were flushed immediately. The maximum response time 135 is a constant value maintained in the transaction system 100 and is used to provide a certain response time for the flushing operation. If the maximum response time 135 will not be met, the flush processor 108 proceeds to step 210. If the maximum response time 135 will be met, the flush processor 108 proceeds to step 220. The process of determining whether the maximum response time 135 will be met is described in more detail below with regard to FIG. 4.

At step 220, the flush processor 108 determines whether the rate of data associated with incoming transactions (that is, the rate of data submitted by new transactions to the data buffer) is higher than the rate of flushing the data buffer 130 to the stable storage device 115 if the data buffer 130 were flushed immediately. The rate of data submitted by incoming transactions to the data buffer flush 155 is a variable parameter maintained by the transaction system 100 while operating. If the rate 155 of data associated with incoming transactions is not higher than the rate of flushing, then the flush processor 108 proceeds to step 210. If the rate 155 of data associated with incoming transactions is higher than the rate of flushing, the flush processor 108 returns to step 200. In step 220, the flush processor 108 determines whether the flushing operation using a current rate of flushing and current amount of data per flush will meet the demands of incoming data. If not, the transaction system 100 makes adjustments in the timing and size of the flushing operation to enable an increase in the amount of data flushed in each flushing operation. By doing this, the transaction system 100 amortizes fixed overhead of the flushing operation over a larger number of transactions resulting generally in improved throughput. The response time for each transaction is increased but is still bounded by the maximum response time parameter 135. The processes involved in making the adjustments to timing and size of the flushing operations are described in greater detail in the figures that follow below.

Figure 4:
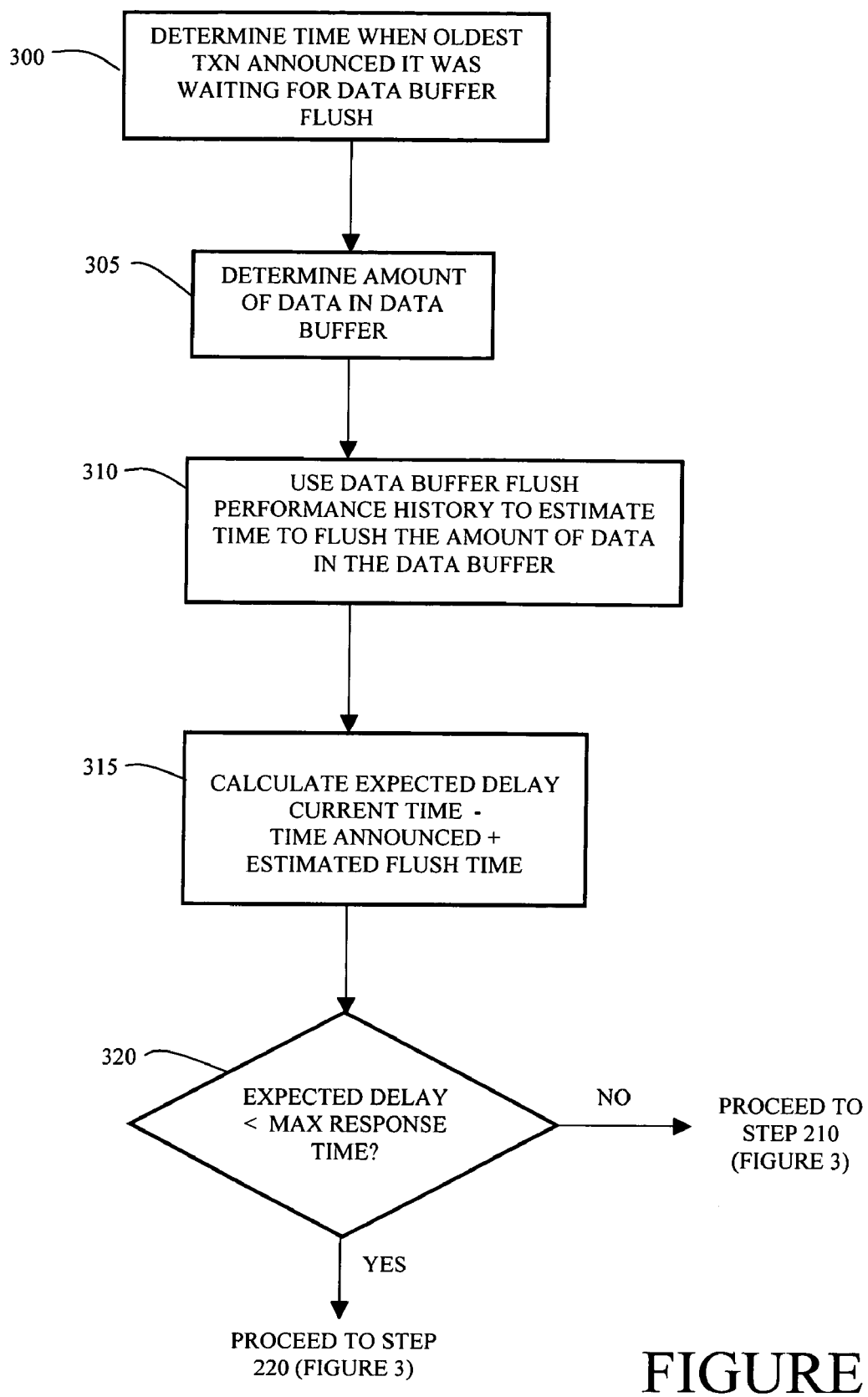
FIG. 4 is a flow chart of the process of determining whether the maximum response time will be met in the flushing operation of FIG. 3.

FIG. 4 is a flow chart of the process of determining whether the maximum response time 135 will be met (step 215 of FIG. 3).

At step 300, the flush processor 108 determines the time when the oldest transaction in the data buffer 130 announced that it was waiting for data buffer flush. The flush processor 108 makes this determination from the metadata 132 maintained in the memory 110 in relation to the data buffer 130.

At step 305, the flush processor 108 determines an amount of data 165 in the data buffer 130. The amount of data 165 in the data buffer 130 is a variable parameter maintained by the transaction system 100 while operating. The transaction system 100 updates the amount of data parameter 165 as data accumulates and resets the amount of data parameter 165 to zero after each flushing operation.

At step 310, the flush processor 108 uses the data buffer flush performance history 150 shown in FIG. 5 to estimate the time to flush the amount of data in the data buffer 130.

FIG. 5 is a block diagram of the data buffer flush performance history 150 according to the invention. The data buffer flush performance history 150 is a table of amounts of data buffer size 350 written to the data buffer 130, observed times to flush 355 the data buffer 130 to the stable storage device 115, and a target size of data per flush 360 also referred to as a target batch size. The values provided in FIG. 5 are merely exemplary and are not considered limiting to the invention.

Each row in the table is referred to as a bucket 365. The amounts of data 350 are provided as ranges of data. Accord ingly, each bucket 365 has a range of data. Each bucket 365 also accumulates observed times to flush the data buffer 130. After each flush, the table is updated by entering the time to flush the data buffer 130 using the bucket corresponding to the size of the data buffer flushed. The new entry does not override existing entries; the new entry is added to the existing entries. The bucket history length constant 140, a constant value maintained by the transaction system 100, limits the number of entries maintained in each cell in column 355. When a bucket 365 exceeds the bucket history length constant 140, the oldest entry of observed time in the bucket 365 is deleted. At initialization of the transaction system 100, observed times to flush 355 and the target batch sizes 360 are unknown. Optimized values of target batch sizes 360 are determined as an average of the bucket's minimum and maximum buffer size Returning to FIG. 4, the flush processor 108 selects a bucket 365 in the table according to the amount of data in the data buffer 130. The flush processor 108 then averages the entries of observed times to flush 355 to obtain an estimate of the time to flush the data buffer 130.

At step 315, the flush processor 108 calculates the expected delay in flushing the oldest transaction in the data buffer 130. The expected delay is the current time−time announced+estimated flush time.

At step 320, the flush processor 108 determines whether the expected delay is less than the maximum response time. If the expected delay is less than the maximum response time, the transaction system 100 proceeds to step 225 of FIG. 3. If the expected delay is not less than the maximum response time, the transaction system 100 proceeds to step 215 of FIG. 3.

Figure 6:
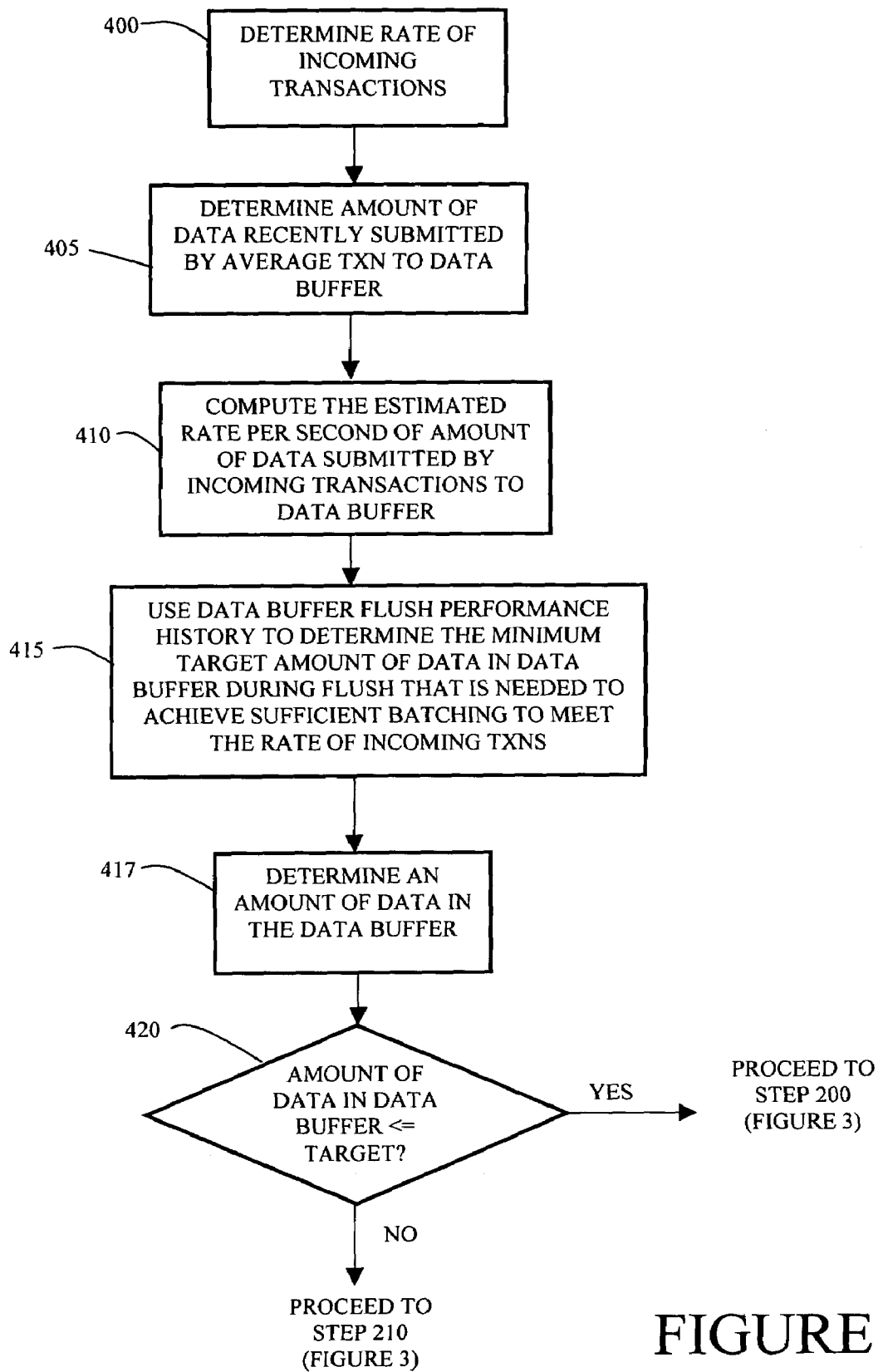
FIG. 6 is a flow chart of the process of determining whether the rate of incoming data is higher than the rate of flushing the data buffer to the stable storage device in the flushing operation of FIG. 3.

FIG. 6 is a flow chart of the process of determining whether the rate of incoming data is higher than the rate of flushing the data buffer to the stable storage device (step 220 of FIG. 3).

At step 400, the flush processor 108 determines the rate of incoming transactions.

At step 405, the flush processor 108 determines an average amount of data submitted by recent transactions to the data buffer 130. This is determined, for example, by maintaining amounts of data for a specified number of previous transactions in memory 110 in the metadata 132. The flush processor 108 then averages the values to obtain an amount of data submitted by the average transaction, also referred to as the average transaction data buffer size 160. The average transaction buffer size 155 is a variable computed by the transaction system 100 during operation. Other ways of making the determination of the average transaction buffer size 155 are possible and the invention is not limited to the method described here.

At step 410, the flush processor 108 computes the estimated rate per second of amount of data submitted by the incoming transactions to the data buffer 130.

At step 415, the flush processor 108 uses the data buffer flush performance history 150 to determine the minimum target amount of data 145 in the data buffer 130 during flush that is needed to achieve sufficient batching to meet the rate of incoming transactions. The minimum target amount of data 145 is a variable parameter used by the transaction system 100 during operation. The process of determining the target amount of data 145 is described in FIG. 9.

At step 417, the flush processor 108 determines the amount of data 165 in the data buffer 130.

At step 420, the flush processor 108 determines whether the amount of data 165 in the data buffer 130 is less than or equal to the target amount 145. If the amount of data 165 is less than or equal to the target amount 145, the transaction system 100 proceeds to step 200 of FIG. 3. If the amount of data 165 is greater than the target amount 145, the transaction system 100 proceeds to step 210 of FIG. 3.

Figure 7:
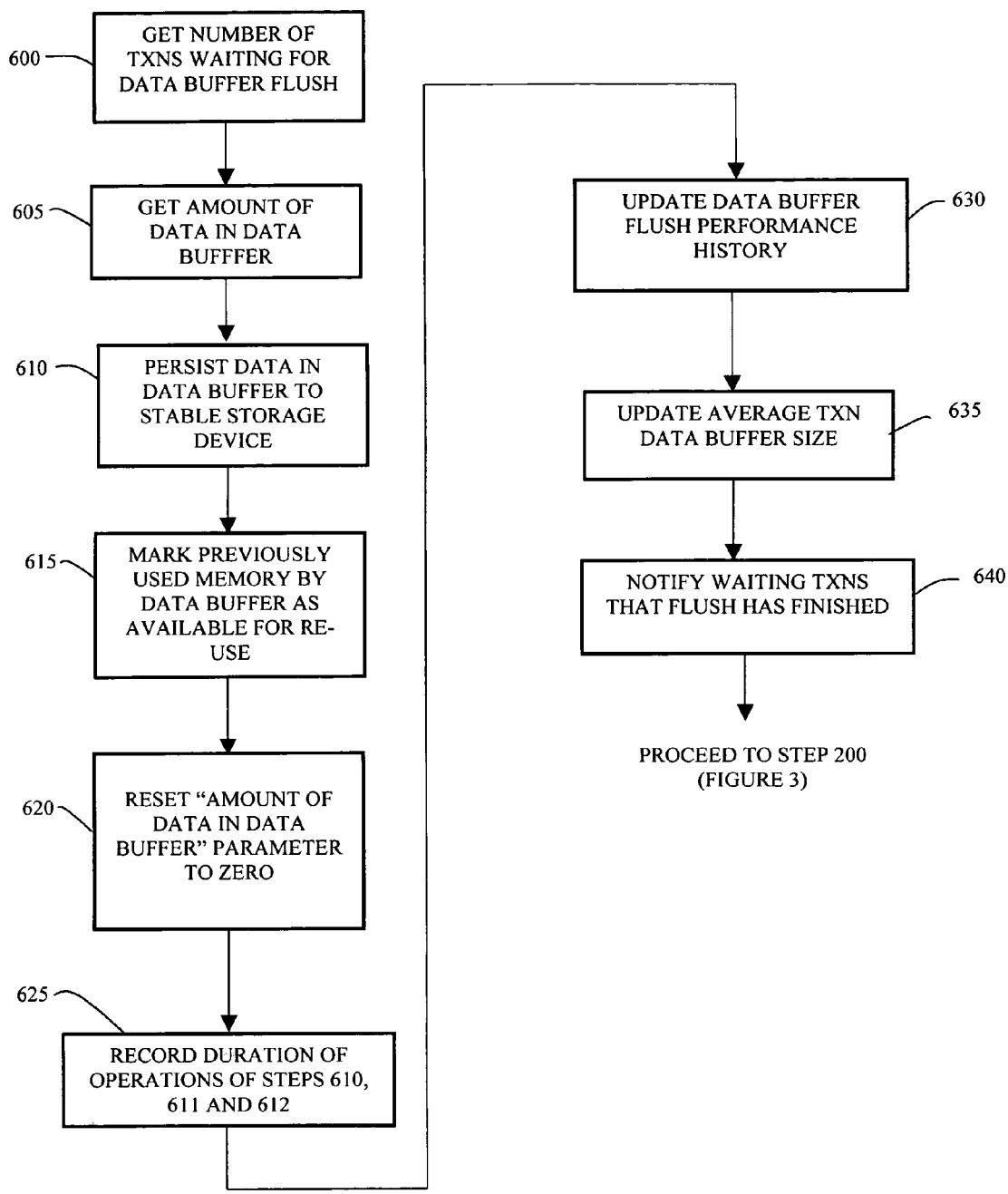
FIG. 7 is a flow chart of the process of updating the flush performance history of FIG. 1.

FIG. 7 is a flow chart of the process of flushing the data buffer 130 to the stable storage device 115.

At step 600, the flush processor 108 gets the number of transactions waiting in the data buffer 130 for data buffer flush. This number is maintained by the memory 110 in, for example, the metadata 132 in association with the data buffer 130 as described above.

At step 605, the flush processor 108 gets the amount of data 165 in the data buffer 130.

At step 610, the flush processor 108 persists the data in a data buffer 130 to the stable storage device 115. That is, the flush processor 108 copies the data in the data buffer 130 to the stable storage device 115.

At step 615, the flush processor 108 marks previously used memory by the data buffer 130 as available for re-use.

At step 620, the flush processor 108 resets the data buffer size parameter 165 to zero.

At step 625, the flush processor 108 records the duration of the operations of persisting, marking and resetting.

Figure 8:
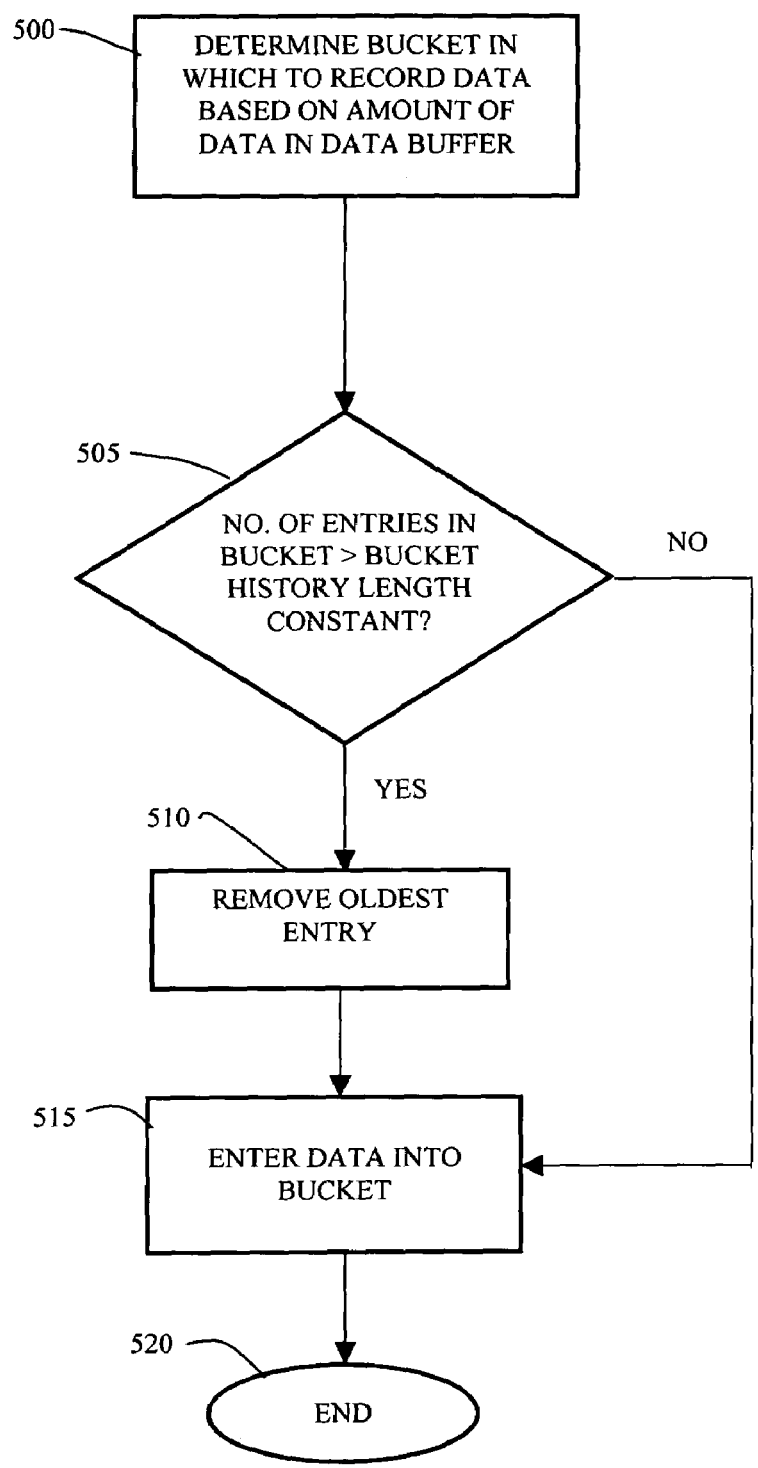
FIG. 8 is a flow chart of the process of flushing the data buffer to the stable storage device in the flushing operation of FIG. 3.

At step 630, the flush processor 108 updates the observed time to flush in the data buffer flush performance history 150 as described in FIG. 8.

At step 635, the flush processor 108 updates the average transaction data buffer size 160.

At step 640, the flush processor 108 notifies the transaction processor 106 that a flush has finished.

The transaction system 100 then proceeds to step 200 of FIG. 3.

FIG. 8 is a flow chart of the process of updating the data buffer flush performance history 150 (an expansion of step 630 of FIG. 7).

At step 500, the flush processor 108 determines a bucket 365 in which to record data based on the amount of data 165 in the data buffer 130.

At step 505, the flush processor 108 determines whether the number of entries in the bucket 365 selected in step 500 is greater than the bucket history length constant 140. If the number of entries is greater, then the flush processor 108 proceeds to step 510. If the number of entries is not greater, then the flush processor 108 proceeds to step 515.

At step 510, the flush processor 108 removes the oldest entry in the selected bucket 365.

At step 515, the flush processor 108 enters the observed duration into column 355.

At step 520, the update process ends.

Figure 9:
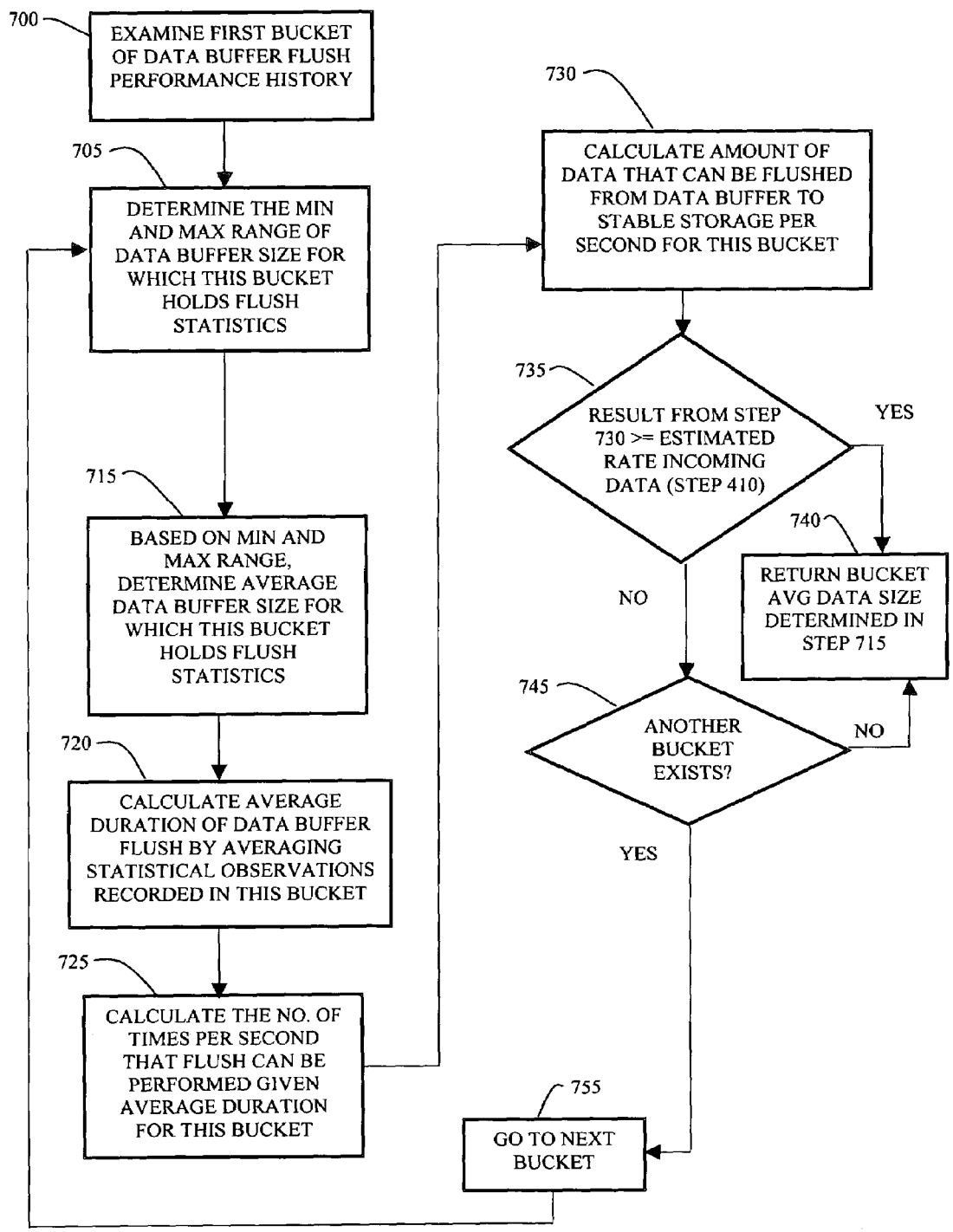
FIG. 9 is a flow chart of the process of computing the target batch size of the flushing operation of FIG. 3.

FIG. 9 is a flow chart of the process of computing the target batch size.

At step 700, the flush processor 108 examines a first bucket 365 of the data buffer flush performance history 150. The flush processor 108 examines the buckets in buffer size order. That is, the first bucket examined has the smallest minimum and maximum buffer size values.

At step 705, the flush processor 108 determines the minimum and maximum range of data buffer size 350 for which the selected bucket holds flush statistics.

At step 715, the flush processor 108 determines an average data buffer size for which the selected bucket holds flush statistics. This determination is based on the average of the minimum and maximum range for the selected bucket.

At step 720, the flush processor 108 calculates an average duration of the data buffer flush by averaging observed times 355 recorded in the selected bucket 365.

At step 725, the flush processor 108 calculates the number of times per second that the flush can be performed given the average duration for the selected bucket 365.

At step 730, the flush processor 108 calculates the amount of data that can be flushed from the data buffer 130 to the stable storage device 115 per second for the selected bucket 365.

At step 735, the flush processor 108 determines whether the amount of data from step 730 is greater than or equal to the estimated rate of incoming data (calculated in step 410). If the amount of data is greater than or equal to the estimated rate, the flush processor 108 proceeds to step 740. If the amount of data is not greater than or equal to the rate of incoming data, the flush processor 108 proceeds to step 745.

At step 740, the flush processor 108 returns the bucket average data size determined in step 715. The flush processor 108 updates the transaction data size value of the selected bucket of the data buffer flush performance history 150 with the bucket average data size.

At step 745, the flush processor 108 determines whether there is another bucket 365 in the data buffer flush performance history 150. If there are no other buckets 365 in the data buffer flush performance history 150, the flush processor 108 proceeds to step 740. If there is another bucket in the data buffer flush performance history 150, the flush processor 108 proceeds to step 755

At step 755, the flush processor 108 selects the next bucket 365 from the data buffer flush performance history 150, the next bucket having larger minimum and maximum buffer size values than the previous bucket.

The transaction system 100 of the present invention makes an intelligent decision about when to invoke a flush using a feedback based method. Further, the transaction system 100 collects feedback data continuously enabling the transaction system 100 to respond to changing conditions in the data input.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a self-tuning transaction system that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a self-tuning transaction system that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for efficiently batching transactions in a computerized system, comprising the steps of:

receiving a transaction at the computerized system;

writing the received transaction data to a data buffer;

if the received transaction is an only transaction in the computerized system, then flushing the data buffer to a non-volatile storage device;

if the received transaction is not the only transaction in the computerized system, then determining whether a maximum response time will be met for an oldest transaction waiting for flush in the computerized system if the data buffer were flushed to the storage device immediately;

if the maximum response time will not be met, then flushing the data buffer to the non-volatile storage device;

if the maximum response time will be met, then determining whether a rate of data of incoming transactions is higher than a rate of flushing data from the data buffer to the non-volatile storage device if flushed immediately;

if the rate of data of incoming transactions is lower than the rate of flushing data from the data buffer to the non-volatile storage device if flushed immediately, then flushing the data buffer to the non-volatile storage device;

if the rate of incoming data is higher than the rate of flushing data from the data buffer to the non-volatile storage device if flushed immediately, then waiting to receive another transaction; and updating a flush performance history after each flush of the data buffer to the non-volatile storage device.

2. The method of claim 1 wherein the step of determining whether the maximum response time will be met, comprises the steps of:

determining a time queued of the oldest transaction waiting for flush in the computerized system;

determining an amount of data in the data buffer;

using the flush performance history to compute a time duration to flush the data buffer to the non-volatile storage device based on the amount of data in the data buffer;

calculating an expected delay in flushing the oldest transaction to the non-volatile storage device by subtracting the time when the oldest transaction announced that it was waiting for flush from a current time and adding the time to flush the data buffer to the non-volatile storage device;

comparing the expected delay to a maximum response value;

if the expected delay is not less than the maximum response value, then flushing the data buffer to the non-volatile storage device; and if the expected delay is less than the maximum response value, then proceeding to the step of determining the rate of incoming data.

3. The method of claim 1 wherein the step of determining whether a rate of data of incoming transactions is higher than a rate of flushing data from the data buffer to the non-volatile storage device comprises the steps of:

determining a rate of incoming transactions;

determining an amount of data submitted by an average transaction to the data buffer by maintaining amounts of data for a specified number of recent transactions and averaging the maintained amounts of data;

computing a rate per second of an amount of data submitted to the data buffer by the incoming transactions;

determining a target amount of data in the data buffer that is needed to achieve sufficient batching in a flush operation based on the rate of data of incoming transactions and the flush performance history;

determining an amount of data in the data buffer;

comparing the amount of data in the data buffer to the target amount of data; and if the amount of data in the data buffer is not greater than the target amount of data, then waiting for a next received transaction; and if the amount of data in the data buffer is greater than the target amount of data, then flushing the data buffer to the non-volatile storage device.

4. The method of claim 1 wherein the step of flushing the data buffer to the non-volatile storage device comprises the steps of:

determining how many transactions are waiting for a flush of the data buffer;

determining an amount of data in the data buffer;

persisting the data in the data buffer to the non-volatile storage device;

marking previously used memory by the data buffer as available for re-use;

resetting a data buffer size parameter to zero;

determining a duration for the writing, marking and resetting steps;

updating the data buffer flush performance history with the determined duration for writing, marking and resetting;

determining an amount of data submitted by an average transaction to the data buffer by maintaining amounts of data for a specified number of recent transactions and averaging the maintained amounts of data;

updating an average transaction data buffer size parameters; and notifying waiting transactions that the flush has completed.

5. The method of claim 1 wherein the flush performance history is a table having a plurality of buckets, each bucket having a minimum and a maximum amount of data buffer data for which that bucket holds statistics, each bucket capable of storing a plurality of entries, wherein each entry is an observed time to flush the data in the data buffer to the non-volatile storage device, wherein the step of updating the table of rates comprises the steps of:

selecting a bucket in the plurality in which to record a data update based on the amount of data in the data buffer; and entering the data update into the selected bucket wherein the data update includes a time duration for flushing the data in the data buffer to the non-volatile storage device.

6. The method of claim 5 wherein the step of updating the table of rates further comprises the steps of:

comparing the number of entries in the selected bucket to a bucket history length constant; and if the number of entries in the selected bucket is more than the bucket history length constant, then removing the oldest entry.

7. The method of claim 3 wherein the flush performance history is a table having a plurality of buckets, each bucket having a minimum and a maximum amount of data buffer data for which that bucket holds statistics, each bucket capable of storing a plurality of entries, wherein each entry is an observed time to flush the data buffer to the non-volatile storage device and wherein the step of determining a target amount of data comprises the steps of:

a) selecting a first bucket in the flush performance history;

b) determining a minimum and maximum amount of data buffer data for which the selected bucket holds flush statistics;

c) based on the minimum and maximum amount of data, determining an average amount of data in the data buffer for which the selected bucket holds flush performance data;

d) calculating an average duration of a flush of the data buffer by averaging values in the plurality of entries in the selected bucket;

e) calculating a number of times per second that a flush can be called based on the average duration of a flush for the selected bucket;

f) calculating a rate of flushing for the selected bucket;

g) comparing the rate of flushing for the selected bucket to the rate of incoming data;

h) if the rate of flushing for the selected bucket is not less than the rate of incoming data, then taking the average amount of data in the data buffer for the selected bucket as the target amount of data;

i) if the rate of flushing for the selected bucket is less than the rate of incoming data, determining whether there is at least one other bucket in the flush performance history;

j) if there is at least one other bucket in the flush performance history, selecting a second bucket in the flush performance history and repeating steps b)–j); and k) if there is not at least one other bucket in the flush performance history, then taking the average amount of data in the data buffer for the selected bucket as the target amount of data.

8. A method for efficiently batching transactions in a database system, comprising the steps of:
receiving a transaction at the database system;
writing the received transaction data to a data buffer;
if the received transaction is an only transaction in the computerized system, then flushing the data buffer to a database;
if the received transaction is not the only transaction in the computerized system, then determining whether a maximum response time will be met for an oldest transaction waiting for flush in the computerized system if the data buffer were flushed to the database immediately;
if the maximum response time will not be met, then flushing the data buffer to the database;
if the maximum response time will be met, then determining whether a rate of data of incoming transactions is higher than a rate of flushing data from the data buffer to the database if flushed immediately;
if the rate of data of incoming transactions is lower than the rate of flushing data from the data buffer to the database if flushed immediately, then flushing the data buffer to the database;
if the rate of incoming data is higher than the rate of flushing data from the data buffer to the database if flushed immediately, then waiting to receive another transaction; and
updating a flush performance history after each flush of the data buffer to the database.

9. A transaction system that efficiently batches transactions, comprising:
a data interface to receive transactions;
a non-volatile storage device to store processed transactions;
a memory including a data buffer and a system performance history, the system performance history including system performance data about rates of flushing the data buffer to the non-volatile storage device and batch sizes of flushing the data buffer to the non-volatile storage device; and
a controller coupled to the interface, the non-volatile storage device and the memory, the controller configured to process the transactions, to write the processed transactions to the data buffer, to flush the data buffer to the non-volatile storage device according to the system performance data from the system performance history, and to update the system performance history with data from the flush of the data buffer to the non-volatile storage device.

10. The system of claim 9 wherein the controller further comprises:
a transaction processor to process transaction and to write the processed transactions; and
a flush processor to flush the data buffer to the non-volatile storage device and to update the system performance history.

11. The system of claim 9 wherein the controller further comprises a maximum response time value, the controller being further configured to determine whether a maximum response time will be met for an oldest transaction in the data buffer and if the maximum response time will not be met, to flush the data buffer to the non-volatile storage device.

12. The system of claim 11 wherein the response time is determined based on information from the system performance history.

13. The system of claim 9 wherein the controller is configured to determine a rate of incoming data and to determine a rate of flushing data, and if the rate of incoming data is higher than the rate of flushing data, then to wait for further transactions in order to develop a larger batch of processed transactions.

14. The system of claim 9 wherein the controller is further configured to adjust frequency of flushing and amount of data per flush to the non-volatile storage device based on information from the system performance history.

15. The system of claim 9 wherein the system performance history is a table having a plurality of buckets, each bucket having a minimum and a maximum amount of data buffer data for which that bucket holds statistics, each bucket capable of storing a plurality of entries, and wherein each entry is an observed time to flush the data in the data buffer to the non-volatile storage device.

16. The system of claim 15 wherein the controller is further configured to select a bucket in the plurality of buckets in the system performance history into which to record a data update, the controller to select based on an amount of data in the data buffer, the controller is further configured to enter the data update into the selected bucket where the data update includes a time duration for flushing data in the data buffer to the non-volatile storage device.

17. The system of claim 15 wherein the system performance history includes a bucket history length constant, and wherein the controller is configured to compare the number of entries in the selected bucket to the bucket history length constant and if the number of entries exceeds the bucket history length constant, top remove old entries in excess of the bucket history length constant.

18. A database system that efficiently batches transactions, comprising:
a data interface to receive database transactions;
a non-volatile storage device having a database to store processed database transactions;
a memory including a data buffer and a system performance history, the system performance history including system performance data about rates of flushing the data buffer to the database and batch sizes of flushing the data buffer to the database; and
a controller coupled to the interface, the non-volatile storage device and the memory, the controller configured to process the transactions, to write the processed transactions to the data buffer, to flush the data buffer to the database according to the system performance data from the system performance history, and to update the system performance history with data from the flush of the data buffer to the database.

19. A computer program product having a computer-readable medium including computer program logic encoded thereon that, when performed on a computer system directs the computer system to perform the method of:
receiving a transaction at the computerized system;
writing the received transaction data to a data buffer;
if the received transaction is an only transaction in the computerized system, then flushing the data buffer to a non-volatile storage device;
if the received transaction is not the only transaction in the computerized system, then determining, in the computerized system, whether a maximum response time will be met for an oldest transaction waiting for flush in the computerized system if the data buffer were flushed to the non-volatile storage device immediately;

if the maximum response time will not be met, then flushing the data buffer to the non-volatile storage device;

if the maximum response time will be met, then determining, in the computerized system, whether a rate of data of incoming transactions is higher than a rate of flushing data from the data buffer to the non-volatile storage device if flushed immediately;

if the rate of data of incoming transactions is lower than the rate of flushing data from the data buffer to the non-volatile storage device if flushed immediately, then flushing the data buffer to the non-volatile storage device;

if the rate of incoming data is higher than the rate of flushing data from the data buffer to the non-volatile storage device if flushed immediately, then waiting to receive another transaction; and updating a flush performance history in the computerized system after each flush of the data buffer to the non-volatile storage device.

20. A system for efficiently batching transactions in a computerized system, comprising:

means for receiving a transaction at the computerized system;

means for writing the received transaction data to a data buffer;

means for flushing the data buffer to a non-volatile storage device if the received transaction is an only transaction in the computerized system;

means for determining whether a maximum response time will be met for an oldest transaction waiting for flush in the computerized system if the data buffer were flushed to the non-volatile storage device immediately if the received transaction is not the only transaction in the computerized system;

means for flushing the data buffer to the non-volatile storage device if the maximum response time will not be met;

means for determining whether a rate of data of incoming transactions is higher than a rate of flushing data from the data buffer to the non-volatile storage device if flushed immediately if the maximum response time will be met;

means for flushing the data buffer to the non-volatile storage device if the rate of data of incoming transactions is lower than the rate of flushing data from the data buffer to the non-volatile storage device if flushed immediately;

means for waiting to receive another transaction if the rate of incoming data is higher than the rate of flushing data from the data buffer to the non-volatile storage device if flushed immediately; and means for updating a flush performance history after each flush of the data buffer to the non-volatile storage device.

* * * * *